(12) United States Patent
Shabestary et al.

(10) Patent No.: US 12,051,434 B2
(45) Date of Patent: Jul. 30, 2024

(54) STFT-BASED ECHO MUTER

(71) Applicant: Google LLC, Mountain View, CA (US)

(72) Inventors: Turaj Zakizadeh Shabestary, Mountain View, CA (US); Arun Narayanan, Milpitas, CA (US)

(73) Assignee: Google LLC, Mountain View, CA (US)

( * ) Notice: Subject to any disclaimer, the term of this patent is extended or adjusted under 35 U.S.C. 154(b) by 33 days.

(21) Appl. No.: 17/643,825

(22) Filed: Dec. 11, 2021

(65) Prior Publication Data

US 2023/0079828 A1 Mar. 16, 2023

Related U.S. Application Data

(60) Provisional application No. 63/261,281, filed on Sep. 16, 2021.

(51) Int. Cl.
*G10L 21/0224* (2013.01)
*G10L 21/0208* (2013.01)
*G10L 21/0232* (2013.01)

(52) U.S. Cl.
CPC ...... *G10L 21/0224* (2013.01); *G10L 21/0232* (2013.01); *G10L 2021/02082* (2013.01)

(58) Field of Classification Search
None
See application file for complete search history.

(56) References Cited

U.S. PATENT DOCUMENTS

| | | | | |
|---|---|---|---|---|
| 10,586,534 | B1 * | 3/2020 | Argyropoulos | G10L 15/22 |
| 10,622,009 | B1 * | 4/2020 | Zhang | G06N 20/00 |
| 2009/0046847 | A1 * | 2/2009 | Wu | H04M 9/082 379/406.01 |

(Continued)

FOREIGN PATENT DOCUMENTS

WO 0156263 A1 8/2001

OTHER PUBLICATIONS

Seon Joon Park et al., Integrated Echo and Noise Canceler for Hands-Free Applications, 49 IEEE Trans. on Circuits and Sys.—II: Analog and Digital Signal Process. 188 (Mar. 2002) (Year: 2002).*
Kyu-Ho Lee et al: "Frequency-Domain Double-Talk Detection Based on the Gaussian Mixture Model", IEEE Signal Processing Letters, IEEE, USA, vol. 17, No. 5, May 1, 2010 (May 1, 2010), pp. 453-456, XP011303388, ISSN: 1070-9908, 3 pages.

(Continued)

*Primary Examiner* — Walter F Briney, III
(74) *Attorney, Agent, or Firm* — Honigman LLP; Brett A. Krueger; Grant Griffith

(57) ABSTRACT

A method for Short-Time Fourier Transform-based echo muting includes receiving a microphone signal including acoustic echo captured by a microphone and corresponding to audio content from an acoustic speaker, and receiving a reference signal including a sequence of frames representing the audio content. For each frame in a sequence of frames, the method includes processing, using an acoustic echo canceler configured to receive a respective frame as input to generate a respective output signal frame that cancels the acoustic echo from the respective frame, and determining, using a Double-talk Detector (DTD), based on the respective frame and the respective output signal frame, whether the respective frame includes a double-talk frame or an echo-only frame. For each respective frame that includes the echo-only frame, muting the respective output signal frame, and performing speech processing on the respective output signal frame for each respective frame that includes the double-talk frame.

24 Claims, 4 Drawing Sheets

(56) References Cited

U.S. PATENT DOCUMENTS

| | | |
|---|---|---|
| 2015/0126255 A1 | 5/2015 | Yang et al. |
| 2019/0096419 A1 | 3/2019 | Giacobello |
| 2019/0222691 A1 | 7/2019 | Shah et al. |

OTHER PUBLICATIONS

International Search Report and Written Opinion for the related application No. PCT/US2021/062970, dated May 31, 2022, 51 pages.

\* cited by examiner

STFT-BASED ECHO MUTER

CROSS REFERENCE TO RELATED APPLICATIONS

This U.S. patent application claims priority under 35 U.S.C. § 119(e) to U.S. Provisional Application 63/261,281, filed on Sep. 16, 2021. The disclosure of this prior application is considered part of the disclosure of this application and is hereby incorporated by reference in its entirety.

TECHNICAL FIELD

This disclosure relates to a Short-Time Fourier Transform (STFT)-based echo muter.

BACKGROUND

Speech-enabled devices are capable of generating synthesized playback audio and communicating the synthesized playback audio to one or more users within a speech environment. While the speech-enabled device outputs the synthesized playback audio, a microphone of the speech-enabled device may capture the synthesized playback audio as acoustic echo while actively capturing speech spoken by a user directed toward the speech-enabled device. Unfortunately, with acoustic echo originating from the synthesized playback audio, it may be difficult for a speech recognizer to recognize the speech spoken by the user that occurs during the echo from the synthesized playback audio.

SUMMARY

One aspect of the disclosure provides a computer-implemented method of performing speech recognition using an STFT-based echo muter. The computer-implemented method when executed on data processing hardware causes the data processing hardware to perform operations that include receiving a microphone signal including acoustic echo captured by a microphone. The acoustic echo corresponds to audio content played back from an acoustic speaker. The operations also include receiving a reference signal including a sequence of frames representing the audio content transmitted in a reference channel before the acoustic speaker plays back the audio content. For each frame in a sequence of frames of the microphone signal, the operations also include processing, using an acoustic echo canceler configured to receive a respective frame in the sequence of frames of the reference signal as input, the respective frame of the microphone signal to generate a respective output signal frame that cancels the acoustic echo from the respective frame of the microphone signal. The operations also include determining, using a Double-talk Detector (DTD), based on the respective frame of the reference signal and the respective output signal frame, whether the respective frame of the microphone signal includes a double-talk frame or an echo-only frame. For each respective frame in the sequence of frames of the microphone signal that includes the echo-only frame, the operations also include muting the respective output signal frame. After muting the respective output signal frame for each respective frame in the sequence of frames of the microphone signal that includes the echo-only frame, the operations also include performing speech processing on the respective output signal frame for each respective frame in the sequence of frames of the microphone signal that includes the double-talk frame.

Implementations of the disclosure may include one or more of the following optional features. In some implementations, a portion of the microphone signal further includes audio signal representing target speech captured by the microphone, and determining whether the respective frame of the microphone signal includes the double-talk frame or the echo-only frame when the respective frame of the microphone signal includes the audio signal representing the target speech. Here, the target speech is spoken while the audio content is played back from the acoustic speaker. In some examples, performing speech processing includes performing speech recognition using an automatic speech recognition (ASR) model. In some implementations, prior to using the DTD to determine whether the respective frame of the microphone signal includes the double-talk frame or the echo-only frame, the operations further include converting each respective frame of the microphone, reference, and output signals into a Short-Time Fourier Transform (STFT) domain.

In some examples, determining whether the respective frame of the microphone signal includes the double-talk frame or the echo-only frame includes computing, using the DTD, a respective first frame-level double-talk indicator based on a cross-correlation between the respective frame of the microphone signal and the respective frame of the reference signal, and computing, using the DTD, a respective second frame-level double-talk indicator based on a cross-correlation between the respective frame of the microphone signal and the respective frame of the output signal. These examples also include determining whether or not at least one of the respective first or second frame-level double-talk indicators satisfy a double-talk threshold and when at least one of the respective first or second frame-level double-talk indicators satisfies the double talk threshold, determining the respective frame of the microphone signal includes the double-talk frame. In these examples, determining whether the respective frame of the microphone signal includes the double-talk frame or the echo-only frame may further include determining the respective frame of the microphone signal includes the echo-only frame when both of the respective first and second frame-level double-talk indicators fail to satisfy the double talk threshold. The respective first frame-level double-talk indicator and the respective second frame-level double-talk indicator may both be computed over a predetermined range of frequency subbands. Additionally or alternatively, determining whether or not at least one of the respective first or second frame-level double-talk indicators satisfy the double-talk threshold may include determining that at least one of the respective first or second frame-level double-talk indicators satisfy the double-talk threshold when a minimum of the respective first and second frame-level double-talk indicators is less than the double-talk threshold.

In some implementations, for each frame in the sequence of frames of the microphone signal, the operations further include computing, using the DTD, a respective first frame-level double-talk indicator based on a cross-correlation between the respective frame of the microphone signal and one of the respective frame of the reference signal or the respective frame of the output signal. Here, determining whether the respective frame of the microphone signal includes the double-talk frame or the echo-only frame is based on the respective first frame-level double-talk indicator. In these implementations, the operations may further include computing, using the DTD, a respective second frame-level double-talk indicator based on a cross-correlation between the respective frame of the microphone signal and the other one of the respective frame of the reference signal or the respective frame of the output signal, where determining whether the respective frame of the microphone signal includes the double-talk frame or the echo-only frame is further based on the respective second frame-level double-talk indicator.

In some examples, the acoustic echo canceler includes a linear acoustic echo canceler. In some implementations, the data processing hardware, the microphone, and the acoustic speaker reside on a user computing device. In some examples, performing speech processing on the respective output signal frame for each respective frame in the sequence of the microphone signal that includes the double-talk frame includes performing speech processing on the respective output signal frame without performing acoustic echo suppression on the respective output signal frame.

Another aspect of the disclosure provides a system for performing speech recognition using an STFT-based echo muter. The system includes data processing hardware and memory hardware in communication with the data processing hardware. The memory hardware stores instructions that when executed on the data processing hardware causes the date processing hardware to perform operations including receiving a microphone signal including acoustic echo captured by a microphone. The acoustic echo corresponds to audio content played back from an acoustic speaker. The operations also include receiving a reference signal including a sequence of frames representing the audio content transmitted in a reference channel before the acoustic speaker plays back the audio content. For each frame in a sequence of frames of the microphone signal, the operation includes processing, using an acoustic echo canceler configured to receive a respective frame in the sequence of frames of the reference signal as input, the respective frame of the microphone signal to generate a respective output signal frame that cancels the acoustic echo from the respective frame of the microphone signal. The operations also include determining, using a Double-talk Detector (DTD), based on the respective frame of the reference signal and the respective output signal frame, whether the respective frame of the microphone signal includes a double-talk frame or an echo-only frame. For each respective frame in the sequence of frames of the microphone signal that includes the echo-only frame, the operations include muting the respective output signal frame. After muting the respective output signal frame for each respective frame in the sequence of frames of the microphone signal that includes the echo-only frame, the operations include performing speech processing on the respective output signal frame for each respective frame in the sequence of frames of the microphone signal that includes the double-talk frame.

This aspect may include one or more of the following optional features. In some implementations, a portion of the microphone signal further includes audio signal representing target speech captured by the microphone, and determining whether the respective frame of the microphone signal includes the double-talk frame or the echo-only frame when the respective frame of the microphone signal includes the audio signal representing the target speech. Here, the target speech is spoken while the audio content is played back from the acoustic speaker. In some examples, performing speech processing includes performing speech recognition using an automatic speech recognition (ASR) model. In some implementations, prior to using the DTD to determine whether the respective frame of the microphone signal includes the double-talk frame or the echo-only frame, the operations further include converting each respective frame of the microphone, reference, and output signals into a Short-Time Fourier Transform (STFT) domain.

In some examples, determining whether the respective frame of the microphone signal includes the double-talk frame or the echo-only frame includes computing, using the DTD, a respective first frame-level double-talk indicator based on a cross-correlation between the respective frame of the microphone signal and the respective frame of the reference signal, and computing, using the DTD, a respective second frame-level double-talk indicator based on a cross-correlation between the respective frame of the microphone signal and the respective frame of the output signal. These examples also include determining whether or not at least one of the respective first or second frame-level double-talk indicators satisfy a double-talk threshold and when at least one of the respective first or second frame-level double-talk indicators satisfies the double talk threshold, determining the respective frame of the microphone signal includes the double-talk frame. In these examples, determining whether the respective frame of the microphone signal includes the double-talk frame or the echo-only frame may further include determining the respective frame of the microphone signal includes the echo-only frame when both of the respective first and second frame-level double-talk indicators fail to satisfy the double talk threshold. The respective first frame-level double-talk indicator and the respective second frame-level double-talk indicator may both be computed over a predetermined range of frequency subbands. Additionally or alternatively, determining whether or not at least one of the respective first or second frame-level double-talk indicators satisfy the double-talk threshold may include determining that at least one of the respective first or second frame-level double-talk indicators satisfy the double-talk threshold when a minimum of the respective first and second frame-level double-talk indicators is less than the double-talk threshold.

In some implementations, for each frame in the sequence of frames of the microphone signal, the operations further include computing, using the DTD, a respective first frame-level double-talk indicator based on a cross-correlation between the respective frame of the microphone signal and one of the respective frame of the reference signal or the respective frame of the output signal. Here, determining whether the respective frame of the microphone signal includes the double-talk frame or the echo-only frame is based on the respective first frame-level double-talk indicator. In these implementations, the operations may further include computing, using the DTD, a respective second frame-level double-talk indicator based on a cross-correlation between the respective frame of the microphone signal and the other one of the respective frame of the reference signal or the respective frame of the output signal, where determining whether the respective frame of the microphone signal includes the double-talk frame or the echo-only frame is further based on the respective second frame-level double-talk indicator.

In some examples, the acoustic echo canceler includes a linear acoustic echo canceler. In some implementations, the data processing hardware, the microphone, and the acoustic speaker reside on a user computing device. In some examples, performing speech processing on the respective output signal frame for each respective frame in the sequence of the microphone signal that includes the double-talk frame includes performing speech processing on the respective output signal frame without performing acoustic echo suppression on the respective output signal frame.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
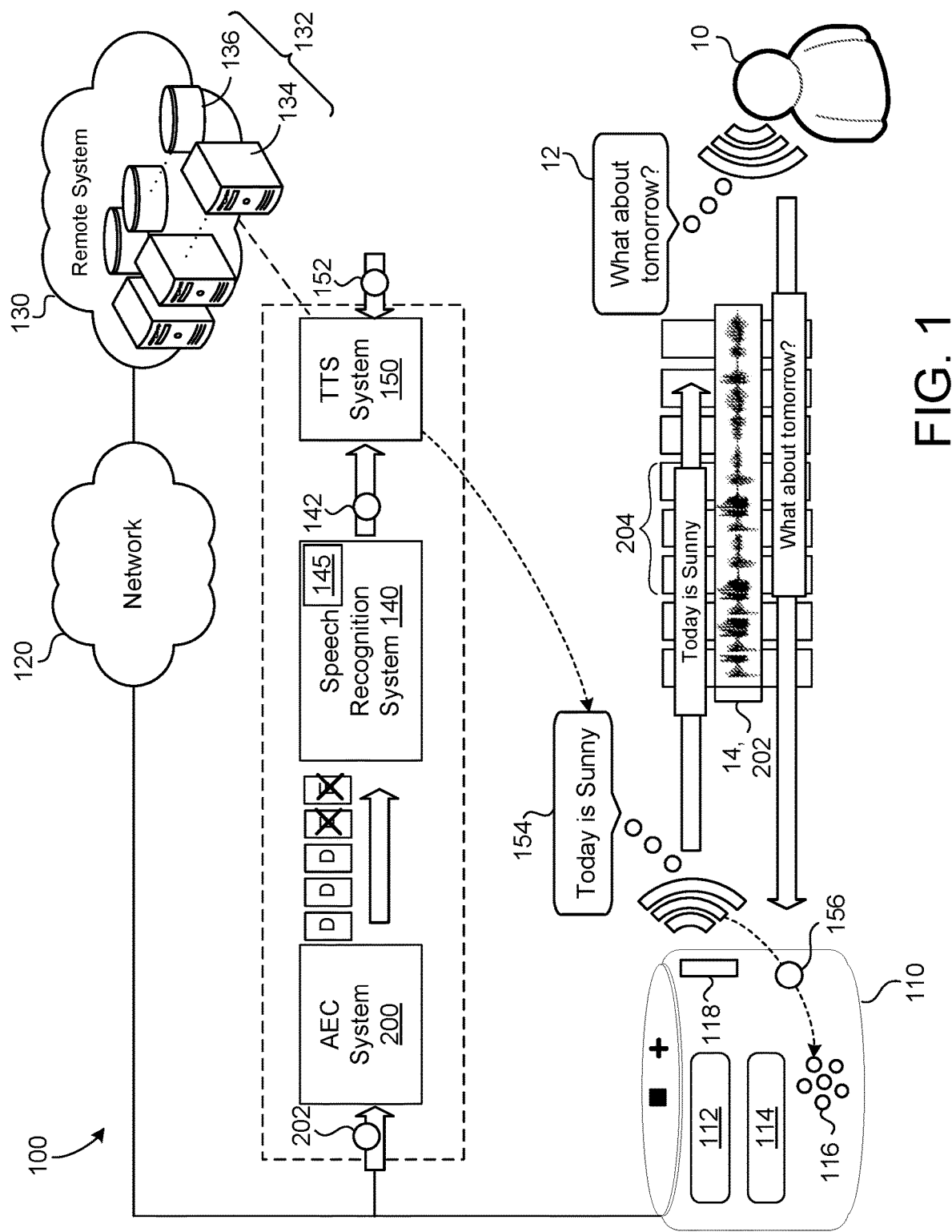
FIG. 1 is a schematic view of an example speech environment using an Acoustic Echo Cancellation (AEC) system.

Speech-enabled devices are capable of generating synthesized playback audio and communicating the synthesized playback audio to one or more users within a speech environment. Here, synthesized playback audio refers to audio generated by the speech-enabled device that originates from the speech-enabled device itself or machine processing systems associated with the speech-enabled device rather a person or other source of audible sound external to the speech-enabled device. Generally speaking, the speech-enabled device generates synthesized playback audio using a text-to-speech (TTS) system. A TTS system converts text to an audio representation of the text where the audio representation of the text is modeled to be like that of a spoken utterance using human language.

While an audio output component (e.g., acoustic speaker) of the speech-enabled device outputs the synthesized playback audio, an audio capturing component (e.g., a microphone) of the speech-enabled device may still be actively capturing (i.e., listening to) audio signals within the speech environment. This means that some portion of synthesized playback audio output from the speaker will be received at the audio capturing component as acoustic echo. The speech-enabled device may also playback other types of audio content, such as media content (e.g., music), that may similarly be captured by the audio capturing component as acoustic echo while actively capturing audio signals within the speech environment. Unfortunately, with acoustic echo originating from the playback audio content (e.g., synthesized audio content), it may be difficult for a speech recognizer implemented at the speech-enabled device, or implemented at a remote system in communication with the speech-enabled device, to understand spoken utterances occurring during the echo from the synthesized playback audio. In other words, a speech-enabled device often generates synthesized playback audio as a response to a query or command from a user of the speech-enabled device. For instance, the user may ask the speech-enabled device "what will the weather be like today?" When the speech-enabled device receives this query or question from the user, the speech-enabled device, or remote system in communication with the speech-enabled device, initially has to determine or process the spoken utterance from the user. By processing the spoken utterance, the speech-enabled device is able to recognize that the spoken utterance corresponds to a query from the user (e.g., regarding the weather) and that, as a query, the user anticipates a response from the speech-enabled device.

Typically, the speech-enabled device uses a speech recognition system (e.g., an automatic speech recognition (ASR) system) to determine the content of the spoken utterance. The speech recognition system receives an audio signal or audio data and generates a transcript of text representing the characters, words, and/or sentences spoken in the audio signal. Speech recognition, however, may become more complicated when the speech capturing component of the speech-enabled device receives echo and/or distortion at the same time as all or part of one or more utterances spoken by the user(s) to the speech-enabled device. For instance, one or more microphones of the speech-enabled device are fed some portion of the synthesized playback audio signal as echo or acoustic feedback. The echo from the synthesized playback audio combined with one or more spoken utterances results in the speech-enabled device receiving an audio signal with overlapping speech. Here, the overlapping speech refers to a double-talk event where an instance in the audio signal where acoustic echo from the synthesized playback audio occurs at the same time (i.e., simultaneous or concurrently) as the one or more spoken utterances. During the double-talk event, the speech recognition system may have a difficult time processing the audio signal received at the speech-enabled device. That is, the overlapping speech may compromise the speech recognition system's ability to generate an accurate transcript for the one or more spoken utterances. Without an accurate transcript from the speech recognition system, the speech-enabled device may fail to accurately respond or respond at all to a query or a command from a spoken utterance by the user. Alternatively, the speech-enabled device may want to avoid using its processing resources attempting to interpret audible sound that is actually echo from the synthesized playback audio signal and/or from the surroundings.

One approach to combat distortion or echo captured by audio capturing components of the speech-enabled device is to use an acoustic echo cancelation (AEC) system. In an AEC system, the AEC system uses an audio signal to cancel the echo related to the audio content played back from the acoustic speaker. However, the audio signal employed by the AEC system to cancel the echo unavoidably creates residual echo, which may further deteriorate the performance of the speech recognition system. In wake word applications, where a predetermined word or phrase is spoken to invoke speech recognition by the speech-enabled device, the residual echo created by the AEC system improves the speech recognition system's ability to spot the wake word. However, in wake word-less applications, this residual echo negatively affects the performance of the speech recognition system. One way to reduce this residual echo is by processing the audio signal employed by the AEC system with a post-filter (e.g., an echo suppressor). However, speech recognition systems are generally sensitive to this post-filter processing of the audio signal, rendering the use of post-filters a suboptimal solution.

Referring to FIG. 1, in some implementations, a speech environment 100 includes a user 10 communicating a spoken utterance 12 to a speech-enabled device 110 (also referred to as a device 110 or a user device 110). The user 10 (i.e., speaker of the utterance 12) may speak the utterance 12 as a query or a command to solicit a response from the device 110. The device 110 is configured to capture sounds from one or more users 10 within the speech environment 100. Here, the audio sounds may refer to a spoken utterance 12 by the user 10 that functions as an audible query, a command for the device 110, or an audible communication captured by the device 110. Speech-enabled systems of the device 110 or associated with the device 110 may field the query for the command by answering the query and/or causing the command to be performed.

Here, the device 110 receives a microphone signal 202 that includes acoustic echo 156 captured by an audio capturing device 116 (also referred to as a microphone) and/or the spoken utterance 12 by the user 10. The acoustic echo 156 corresponds to audio content 154 played back from an audio output device 118 (also referred to as an acoustic speaker). The device 110 may correspond to any computing device associated with the user 10 and capable of receiving microphone signals 202. Some examples of user devices 110 include, but are not limited to, mobile devices (e.g., mobile phones, tablets, laptops, etc.), computers, wearable devices (e.g., smart watches), smart appliances, and internet of things (IoT) devices, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations. In some examples, the device 110 includes one or more applications (i.e., software applications) where each application may utilize one or more speech processing systems 140, 150, 200 associated with device 110 to perform various functions within the application. For instance, the device 110 includes an assistant application configured to communicate synthesized playback audio content 154 to the user 10 to assist the user 10 with various tasks. In other examples, the assistant application or a media application is configured to playback audio content 154 that includes media content (e.g., music, talk radio, podcast content, television/movie content). In additional examples, the application corresponds to an assistant application configured to communicate audio content 154 as synthesized speech for playback from the acoustic speaker 118 to communicate/converse with, or assist, the user 10 with the performance of various tasks. For example, the assistant application may audibly output synthesized speech that is responsive to queries/commands submitted by the user 10 to the assistant application. In additional examples, the audio content 154 played back from the acoustic speaker 118 corresponds to notifications/alerts such as, without limitation, a timer ending, an incoming phone call alert, a doorbell chime, an audio message, etc.

The device 110 includes the microphone 116 for capturing and converting audio data 14 within the speech environment 100 into electrical microphone signals 202, and the acoustic speaker 118 for communicating/outputting the playback audio content 154 (e.g., synthesized playback audio content). While the device 110 implements a microphone 116 in the example shown, the device 110 may implement an array of microphones 116 without departing from the scope of the present disclosure, whereby one or more microphones 116 in the array may not physically reside on the device 110, but be in communication with interfaces/peripherals of the device 110. For example, the device 110 may correspond to a vehicle infotainment system that leverages an array of microphones positioned throughout the vehicle. Similarly, the acoustic speaker 118 may include one or more speakers either residing on the device 110, in communication therewith, or a combination where one or more speakers reside on the device 110 and one or more other speakers are physically removed from the device 110 but in communication with the device 110.

Furthermore, the device 110 may be configured to communicate via a network 120 with a remote system 130. The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing and/or synthesized playback communication. For instance, the device 110 is configured to perform speech recognition using a speech recognition system 140 (e.g., using a speech recognition model 145). Additionally, the device may be configured to perform conversion of text to speech using a TTS system 150 and acoustic echo cancelation using an AEC system 200. These systems 140, 150, 200 may reside on the device 110 (referred to as on-device systems) or reside remotely (e.g., reside on the remote system 130), but in communication with the device 110. In some examples, some of these systems 140, 150, 200 reside locally or on-device while others reside remotely. In other words, any of these systems 140, 150, 200 may be local or remote in any combination. For instance, when a system 140, 150, 200 is rather large in size or processing requirements, the system 140, 150, 200 may reside in the remote system 130. Yet when the device 110 may support the size or the processing requirements of one or more systems 140, 150, 200, the one or more systems 140, 150, 200 may reside on the device 110 using the data processing hardware 112 and/or the memory hardware 114. Optionally, the one or more of the systems 140, 150, 200 may reside on both locally/on-device and remotely. For instance, one or more of the systems 140, 150, 200 may default to execute on the remote system 130 when a connection to the network 120 between the device 110 and remote system 130 is available, but when the connection is lost or the network 120 is unavailable, the systems 140, 150, 200 instead execute locally on the device 110.

A speech recognition system 140 receives an audio signal 202 as an input and transcribes that audio signal into a transcription 142 as an output. Generally speaking, by converting the audio signal 202 into the transcription 142, the speech recognition system 140 allows the device 110 to recognize when a spoken utterance 12 from the user 10 corresponds to a query, a command, or some other form of audio communication. The transcription 142 refers to a sequence of text that the device 110 may then use to generate a response to the query or the command. For instance, if the user 10 asks the device 110 the question of "what will the weather be like today," the device 110 passes the audio signal corresponding to the question "what will the weather be like today" to the speech recognition system 140. The speech recognized system 140 converts the audio signal into a transcript that includes the text of "what will the weather be like today?" The device 110 may then determine a response to the query using the text or portions of the text. For instance, in order to determine the weather for the current day (i.e., today), the device 110 passes the text (e.g., "what will the weather be like today?") or identifying portions of the text (e.g., "weather" and "today") to a search engine. The search engine may then return one or more search results that the device 110 interprets to generate a response for the user 10.

In some implementations, the device 110 or a system associated with the device 110 identifies text 152 that the device 110 will communicate to the user 10 as a response to a query of the spoken utterance 12. The device 110 may then use the TTS system 150 to convert the text 152 into corresponding synthesized playback audio 154 for the device 110 to communicate to the user 10 (e.g., audibly communicate to the user 10) as the response to the query of the spoken utterance 12. In other words, the TTS system 150 receives, as input, text 152 and converts the text 152 to an output of synthesized playback audio 154 where the synthesized playback audio 154 is an audio signal defining an audible rendition of the text 152. In some examples, the TTS system 150 includes a text encoder that processes the text 152 into an encoded format (e.g., a text embedding). Here, the TTS system 150 may use a trained text-to-speech model to generate the synthesized playback audio 154 from the encoded format of the text 152. Once generated, the TTS system 150 communicates the synthesized playback audio 154 to the device 110 to allow the device 110 to output the synthesized playback audio 154. For instance, the device 110 outputs the synthesized playback audio 154 of "today is sunny" at the speaker 118 of the device 110.

With continued reference to FIG. 1, when the device 110 outputs the synthesized playback audio 154 (e.g., synthesized speech), the synthesized playback audio 154 generates the echo 156 which is captured by the microphone 116. Unfortunately, in addition to the echo 156, the microphone 116 may also be simultaneously capturing another spoken utterance 12 from the user 10 that corresponds to target speech directed toward the device 110. For example, FIG. 1 depicts that, as the device 110 outputs the synthesized playback audio content 154, the user 10 inquires more about the weather, in a spoken utterance 12 to the device 110, by stating "what about tomorrow?" Notably, the user 10 speaks the utterance 12 as part of a continued conversation scenario where the device 110 maintains the microphone 116 open and the speech recognition system 140 active to permit the user 10 to provide follow-up queries for recognition by the speech recognition system 140 without requiring the user 10 to speak a hotword (e.g., a predetermined word or phrase that when detected triggers the device 110 to invoke speech recognition). When the utterance 12 spoken by the user 10 includes a hotword, the echo 156 aids the speech recognition system 140 in converting the audio signal 14 into a transcript. However, when the device 110 does not require the user 10 to speak a hotword to perform speech recognition, the user device 110 may process the microphone signal 202 containing the echo 156, causing the user device 110 to process its own playback audio 154 output from the speaker 118.

Here, the spoken utterance 12 and the echo 156 are both captured by the microphone 116 simultaneously to form the microphone signal 202. In other words, the microphone signal 202 includes a portion that only includes the echo 156 corresponding to the playback audio content 154 output from the speaker 118 before the user 10 speaks the utterance 12, an overlapped portion (e.g., overlapped region 204) where the utterance 12 spoken by the user 10 overlaps with some portion of the playback audio content 154 output from the speaker 118, and a portion that includes only the utterance 12 spoken by the user 12 after the acoustic speaker 118 stops output of the playback audio content 154.

In FIG. 1, an overlapping region 204 in the captured microphone signal 202 corresponds to a double-talk event that indicates the instance where the portion of the utterance 12 and the portion of the synthesized playback audio 154 overlap with one another in the captured microphone signal 202. During the double-talk event, the speech recognition system 140 may have issues recognizing the follow-on query 12 corresponding to the weather inquiry "what about tomorrow" in the audio signal 202 captured by the microphone 116 since the utterance 12 is mixed with the echo 156 of the synthesized playback audio content 154. As discussed above, one way to reduce the echo 156 in the microphone signal 202 is by processing the microphone signal 202 with an echo suppressor filter. However, the speech recognition system 140 has difficulty processing this type of filtered microphone signal 202.

To resolve this, the device 110 includes an AEC system 200 to process the microphone signal 202 and provide the output to the speech recognition system 140. The AEC system 200 (FIG. 2) includes an acoustic echo canceller 210, a double-talk detector 220, and an echo muter 230, and is configured to mute audio output signal frames that are identified as echo only, while permitting audio frames that include double-talk to pass through for processing by the speech recognition system 140. In other words, the AEC system 200 receives the microphone signal 202 including the follow-on query 12 mixed with the echo 156. For each audio frame in the microphone signal, the AEC system 200 processes the audio frame and determines whether the audio frame is echo only, or includes double-talk.

Figure 2:
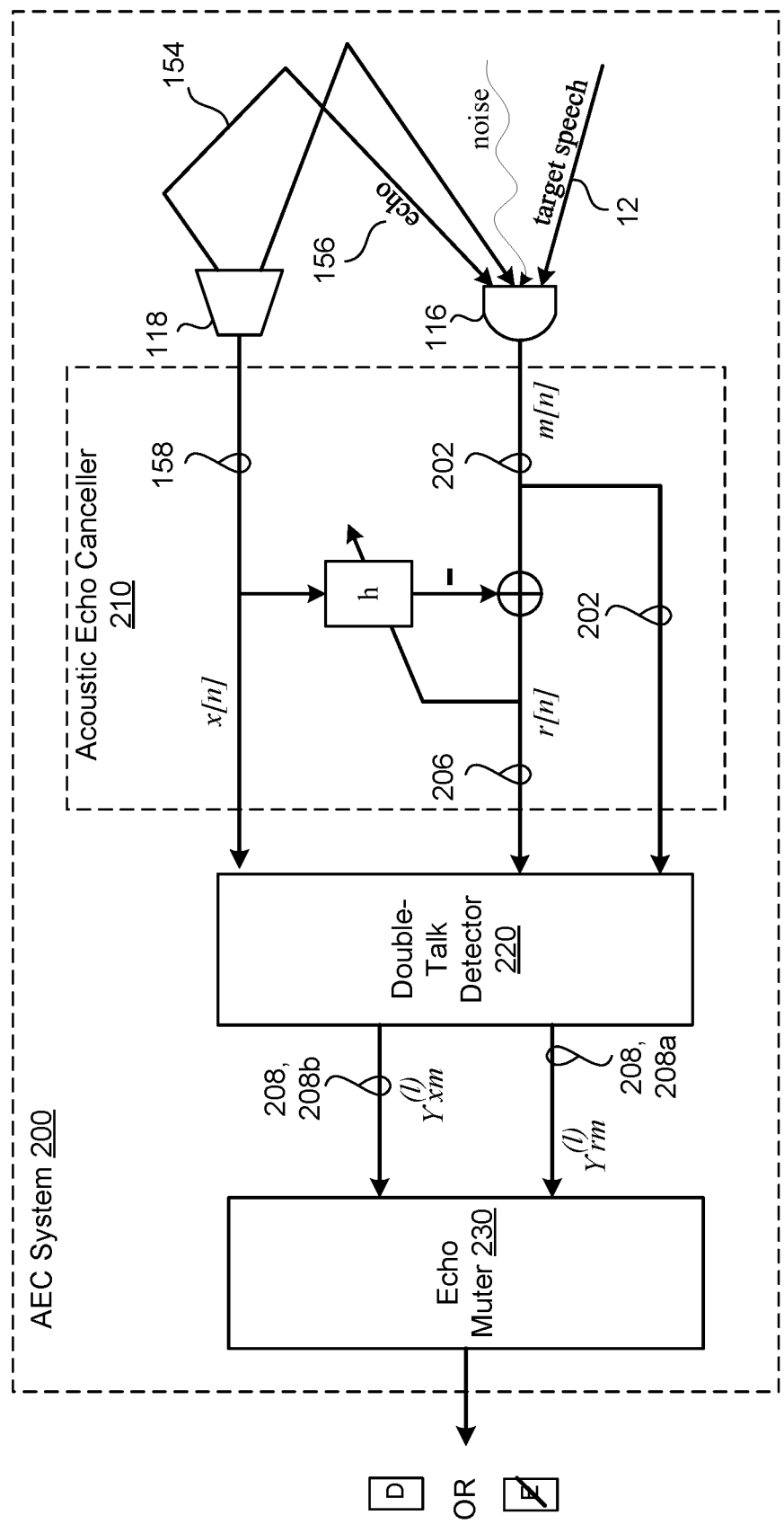
FIG. 2 is a schematic view of the AEC system.

With reference to FIG. 2, the acoustic echo canceller 210 of the AEC system 200 is configured to receive a microphone signal 202 that may simultaneously include respective frames of the of target speech 12 directed toward the device and a reference signal 158 corresponding to respective frames representing the playback audio 154 captured by the microphone 12. For each frame in the sequence of frames, the acoustic echo canceller 210 processes the microphone signal 202 using the reference signal 158 to cancel the echo 156 in the microphone signal 202, thereby producing an output signal frame 206. In some examples, the AEC system 200 further converts each respective frame of the microphone signal 202, the reference signal 158, and the output signal 206 into a Short-Time Fourier Transform (STFT) domain using the following equation:

$$Y(l,k)=\Sigma_n y[n]w[n-lL]\exp(-j2\pi kn/N), k=0,\ldots,N-1 \quad (1)$$

where L denotes the frame-hop, w[n] denotes an analysis window with a possible N point, l denotes the frame index, and k denotes the subband index.

The double-talk detector 220 then receives the respective frames in the STFT domain of the microphone signal m[n] 202 (denoted as M(l,k)), the reference signal x[n] 158 (denoted as X(l,k)), and the residual echo output signal r[n] 206 (denoted as (R(l,k)), and determines whether the respective frames include a double-talk frame or an echo-only frame. To accomplish this, the double-talk detector 220 uses two double-talk indicators 208 per subband in each respective frame. The two double-talk indicators 208a, 208b may be expressed as follows:

$$n_{RM}(k) = 1 - \frac{\|c_{RM}(k)\|^2}{|\sigma_M^2(k)|^2} \quad (2)$$

$$n_{XM}(k) = \frac{\|c_{XM}(k)\|^2}{|\sigma_X^2(k)\|\sigma_M^2(k)|}$$

where $c_{PQ}(k)$ denotes the complex cross-correlation for each subband k, at a lag of zero, of the STFT domain of the playback audio frames 154 P(l,k) and Q(l,k). Here, P(l,k) and Q(l,k) are associateD with the time-domain signalS p[n] and q[n] respectively. The complex cross-correlation $c_{PQ}(k)$ may be expressed as follows:

$$c_{PQ}(k)=E\{P(l,k)Q^*(l,k)\} \quad (3)$$

Where $E\{\bullet\}$ denotes the mathematical expectation and $\bullet^*$ denotes the complex conjugate. Further, the energy in the subband k may be expressed as follows:

$$\sigma_p^2(k) = E\{P(l,k)P^*(l,k)\} \quad (4)$$

A cross-correlation for each subband determines the energy of the subband by using an exponentially weighted averaging over the STFT domain using the following equations:

$$c_{PQ}(l,k) = \rho c_{PQ}(l-1,k) + (1-\rho)P(l,k)Q^*(l,k)$$

$$\sigma^2(l,k) = \rho\sigma^2(l-1,k) + (1-\rho)P(l,k)P^*(l,k) \quad (5)$$

where $\rho$ denotes the exponential weighting factor (i.e., a forgetting factor). For example, an exponential weighting factor $\rho$ of 0.9 may balance estimation accuracy and response time. Using this, Equation (2) may be reformulated and expressed as follows:

$$n_{RM}(l,k) = 1 - \frac{\|c_{RM}(l,k)\|^2}{|\sigma_M^2(l,k)|^2} \quad (6)$$

$$n_{XM}(l,k) = \frac{\|c_{XM}(l,k)\|^2}{|\sigma_X^2(l,k)\|\sigma_M^2(l,k)|}$$

In some examples, a first double-talk indicator 208a is computed by a cross-correlation between the microphone signal 202 and the reference signal 158, while the second double-talk indicator 208b is computed by a cross-correlation between the microphone signal 202 and the output signal 206.

The double-talk detector 220 uses the indicators and subband energies to compute double-talk indicators 208a, 208b for each respective frame by computing a weighted average of a subband indicator over a limited number of subbands. For example, subbands between 700 and 2400 Hz may be used for determining the double-talk indicators 208a, 208b. Each double-talk indicator 208a, 208b is weighed by the energy of the residual in the given subband by cross-correlating each frame in the sequence of frames to determine an energy in the band. The higher the residual energy in a subband indicates a higher likelihood of the presence of double-talk, leading the double-talk indicator 208a, 208b to indicate that the frame contains double-talk. The first double-talk indicator 208a may be calculated as follows:

$$\gamma_{rm}^{(l)} = \left(\frac{1}{\sum_{j=f_1}^{f_2} \sigma_R^2(l,j)}\right) \sum_{k=f_1}^{f_2} n_{RM}(l,k) \cdot \sigma_R^2(l,k). \quad (7)$$

Likewise, a second double-talk indicator 208b may be calculated as follows:

$$\gamma_{xm}^{(l)} = \left(\frac{1}{\sum_{j=f_1}^{f_2} \sigma_R^2(l,j)}\right) \sum_{k=f_1}^{f_2} n_{XM}(l,k) \cdot \sigma_R^2(l,k). \quad (8)$$

Once the double-talk detector 220 has computed the double-talk indicators 208a, 208b as output, it is provided to the echo muter 230 as input for determining whether or not at least one of the double-talk indicators 208a, 208b satisfy a double-talk threshold. In some examples, the double-talk detector 220 only computes one of the first or second double-talk indicators 208a, 208b as input to the echo muter 230 for determining whether the double-talk threshold is satisfied. Given a threshold $\tau$, the double-talk detector 220 determines whether the respective frame is echo-only which should be muted, or includes double-talk which should be passed through. This is determined as follows:

$$\begin{cases} \text{pass through if min } (208a, 208b) < \tau \\ \overline{\text{mute if otherwise}} \end{cases}. \quad (9)$$

When at least one of the double-talk indicators 208a, 208b satisfy the double-talk threshold, the respective frame is passed through for processing by the speech recognition system 140). When both of the double-talk indicators 208a, 208b fail to satisfy the double-talk threshold, the respective frame is identified as echo-only and is muted (i.e., not passed for processing by the speech recognition system). Requiring the minimum of the double-talk indicators 208a, 208b to satisfy the double-talk threshold favors passing through frames over muting frames.

The double-talk threshold $\tau$ may be computed using a data-driven approach. Meta-data is collected from utterances to segment the utterances into echo-only and double-talk intervals. Next, the frame-level double-talk indicators 208a, 208b are calculated for all of the frames in the training dataset. For a given threshold $\tau$, the percentage of misclassification of echo-only and double-talk frames is calculated. This may be repeated for a range of thresholds $\tau$ with the target of identifying a threshold that results in a misclassification of double-talk frames that is 10% or less.

Figure 3:
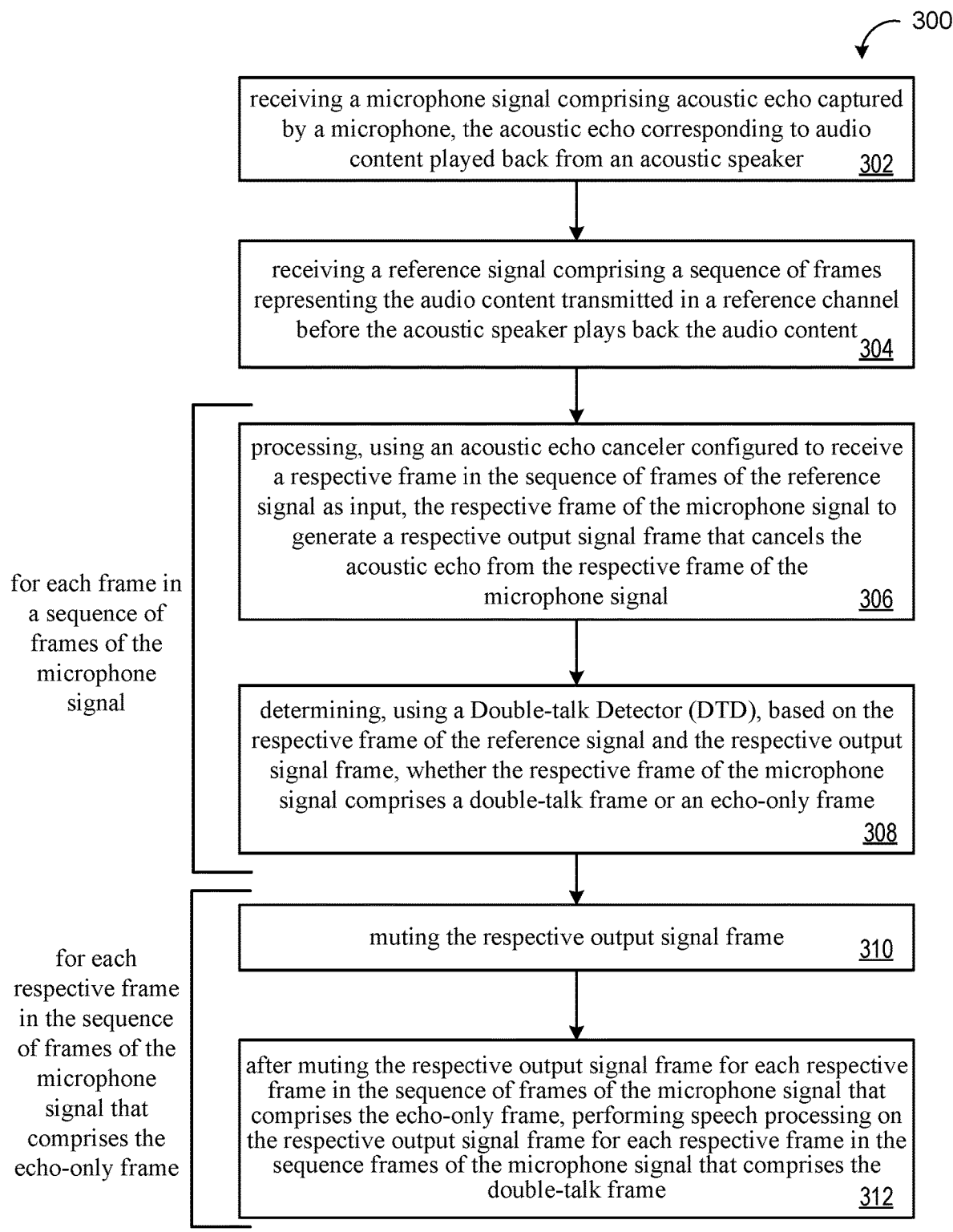
FIG. 3 is a flowchart of an example arrangement of operations for a method of implementing the Acoustic Echo Cancellation system.

FIG. 3 includes a flowchart of an example arrangement of operations for a method 300 of performing speech recognition using an STFT-based echo muter 230. At operation 302, the method 300 includes receiving a microphone signal 202 including acoustic echo 156 captured by a microphone 116. The acoustic echo 156 corresponds to audio content 154 played back from an acoustic speaker 118. At operation 304, the method 300 includes receiving a reference signal 158 including a sequence of frames representing the audio content 154 transmitted in a reference channel before the acoustic speaker 118 plays back the audio content 154.

For each frame in a sequence of frames of the microphone signal 202, the method 300, at operation 306, includes processing, using an acoustic echo canceler 210 configured to receive a respective frame in the sequence of frames of the reference signal 158 as input, the respective frame of the microphone signal 202 to generate a respective output signal frame 206 that cancels the acoustic echo 156 from the respective frame of the microphone signal 202. At operation 308, the method 300 includes determining, using a double-talk-detector 220, based on the respective frame of the reference signal 158 and the respective output signal frame 206, whether the respective frame of the microphone signal 202 includes a double-talk frame or an echo-only frame. For each respective frame in the sequence of frames of the microphone signal 202 that includes the echo-only frame, the method 300 at operation 310 includes muting the respective output signal frame 206. At operation 312, after muting the respective output signal frame 206 for each respective frame in the sequence of frames of the microphone signal 202 that includes the echo-only frame, the method 300 includes performing speech processing on the respective output signal frame 206 for each respective frame in the sequence frames of the microphone signal 202 that includes the double-talk frame.

Figure 4:
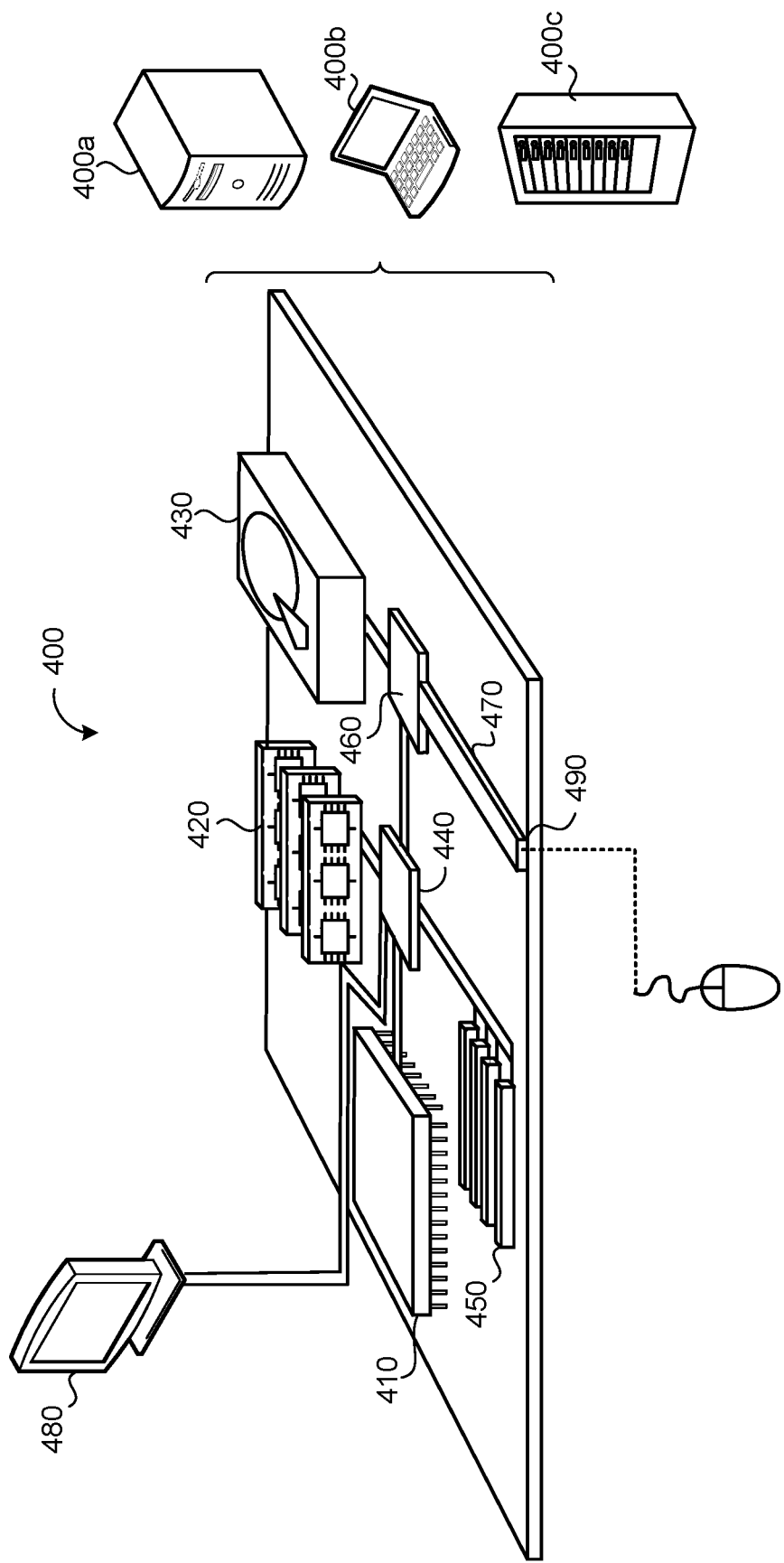
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 (also referred to as "data processing hardware 410" that may include the data processing hardware 112 of the user computing device 110 or the data processing hardware 134 of the remote system 130) can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 (also referred to as "memory hardware 420" that may include the memory hardware 114 of the user computing device 110 or the memory hardware 136 of the remote system 130) stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware that causes the data processing hardware to perform operations comprising:
   receiving a microphone signal comprising acoustic echo captured by a microphone, the acoustic echo corresponding to audio content played back from an acoustic speaker;
   receiving a reference signal comprising a sequence of frames representing the audio content transmitted in a reference channel before the acoustic speaker plays back the audio content;
   for each frame in a sequence of frames of the microphone signal:
      processing, using an acoustic echo canceler configured to receive a respective frame in the sequence of frames of the reference signal as input, the respective frame of the microphone signal to generate a respective output signal frame of an output signal that cancels the acoustic echo from the respective frame of the microphone signal; and
      determining, using a Double-talk Detector (DTD) that processes a plurality of subbands in a short-time Fourier transform (STFT) domain, based on an STFT domain representation of the respective frame of the reference signal and an STFT domain representation of the respective output signal frame, a frame-level determination of whether the respective frame of the microphone signal comprises a double-talk frame or an echo-only frame;
   for each respective frame in the sequence of frames of the microphone signal that comprises the echo-only frame, muting the respective output signal frame; and
   after muting the respective output signal frame for each respective frame in the sequence of frames of the microphone signal that comprises the echo-only frame, performing speech processing on the respective output signal frame for each respective frame in the sequence of frames of the microphone signal that comprises the double-talk frame without performing speech processing on the respective muted output signal frames.

2. The computer-implemented method of claim 1, wherein:
   a portion of the microphone signal further comprises an audio signal representing target speech captured by the microphone, the target speech spoken while the audio content is played back from the acoustic speaker; and
   determining whether the respective frame of the microphone signal comprises the double-talk frame or the echo-only frame when the respective frame of the microphone signal comprises the audio signal representing the target speech.

3. The computer-implemented method of claim 1, wherein performing speech processing comprises performing speech recognition using an automatic speech recognition (ASR) model.

4. The computer-implemented method of claim 1, wherein determining whether the respective frame of the microphone signal comprises the double-talk frame or the echo-only frame comprises:
   computing, using the DTD, a respective first frame-level double-talk indicator based on a cross-correlation between a subband of the STFT domain representation of the respective frame of the microphone signal and a corresponding subband of the STFT domain representation of the respective frame of the reference signal;

computing, using the DTD, a respective second frame-level double-talk indicator based on a cross-correlation between the subband of the STFT domain representation of the respective frame of the microphone signal and a corresponding subband of the STFT domain representation of the respective frame of the output signal;

determining whether or not at least one of the respective first or second frame-level double-talk indicators satisfy a double-talk threshold; and when at least one of the respective first or second frame-level double-talk indicators satisfies the double talk threshold, determining the respective frame of the microphone signal comprises the double-talk frame.

5. The computer-implemented method of claim 4, wherein determining whether the respective frame of the microphone signal comprises the double-talk frame or the echo-only frame further comprises determining the respective frame of the microphone signal comprises the echo-only frame when both of the respective first and second frame-level double-talk indicators fail to satisfy the double talk threshold.

6. The computer-implemented method of claim 4, wherein the respective first frame-level double-talk indicator and the respective second frame-level double-talk indicator are both computed over a predetermined range of frequency subbands.

7. The computer-implemented method of claim 4, wherein determining whether or not at least one of the respective first or second frame-level double-talk indicators satisfy the double-talk threshold comprises determining that at least one of the respective first or second frame-level double-talk indicators satisfy the double-talk threshold when a minimum of the respective first and second frame-level double-talk indicators is less than the double-talk threshold.

8. The computer-implemented method of claim 1, wherein the operations further comprise, for each frame in the sequence of frames of the microphone signal:

computing, using the DTD, a respective first frame-level double-talk indicator based on a cross-correlation between a subband of the STFT domain representation of the respective frame of the microphone signal and a corresponding subband of the STFT domain representation of one of the respective frame of the reference signal or the respective output signal frame, wherein determining whether the respective frame of the microphone signal comprises the double-talk frame or the echo-only frame is based on the respective first frame-level double-talk indicator.

9. The computer-implemented method of claim 8, wherein the operations further comprise, for each frame in the sequence of frames of the microphone signal:

computing, using the DTD, a respective second frame-level double-talk indicator based on a cross-correlation between the subband of the STFT domain representation of the respective frame of the microphone signal and a corresponding subband of the STFT domain representation of the other one of the respective frame of the reference signal or the respective frame of the output signal, wherein determining whether the respective frame of the microphone signal comprises the double-talk frame or the echo-only frame is further based on the respective second frame-level double-talk indicator.

10. The computer-implemented method of claim 1, wherein the acoustic echo canceler comprises a linear acoustic echo canceler.

11. The computer-implemented method of claim 1, wherein the data processing hardware, the microphone, and the acoustic speaker reside on a user computing device.

12. The computer-implemented method of claim 1, wherein performing speech processing on the respective output signal frame for each respective frame in the sequence of the microphone signal that comprises the double-talk frame comprises performing speech processing on the respective output signal frame without performing acoustic echo suppression on the respective output signal frame.

13. A system comprising:
data processing hardware; and
memory hardware in communication with the data processing hardware, the memory hardware storing instructions that when executed on the data processing hardware, cause the data processing hardware to perform operations comprising:

receiving a microphone signal comprising acoustic echo captured by a microphone, the acoustic echo corresponding to audio content played back from an acoustic speaker;

receiving a reference signal comprising a sequence of frames representing the audio content transmitted in a reference channel before the acoustic speaker plays back the audio content;

for each frame in a sequence of frames of the microphone signal:

processing, using an acoustic echo canceler configured to receive a respective frame in the sequence of frames of the reference signal as input, the respective frame of the microphone signal to generate a respective output signal frame of an output signal that cancels the acoustic echo from the respective frame of the microphone signal; and determining, using a Double-talk Detector (DTD) that processes a plurality of subbands in a short-time Fourier transform (STFT) domain, based on an STFT domain representation of the respective frame of the reference signal and an STFT domain representation of the respective output signal frame, a frame-level determination of whether the respective frame of the microphone signal comprises a double-talk frame or an echo-only frame;

for each respective frame in the sequence of frames of the microphone signal that comprises the echo-only frame, muting the respective output signal frame; and after muting the respective output signal frame for each respective frame in the sequence of frames of the microphone signal that comprises the echo-only frame, performing speech processing on the respective output signal frame for each respective frame in the sequence of frames of the microphone signal that comprises the double-talk frame without performing speech processing on the respective muted output signal frames.

14. The system of claim 13, wherein:
a portion of the microphone signal further comprises an audio signal representing target speech captured by the microphone, the target speech spoken while the audio content is played back from the acoustic speaker; and determining whether the respective frame of the microphone signal comprises the double-talk frame or the echo-only frame when the respective frame of the microphone signal comprises the audio signal representing the target speech.

15. The system of claim 13, wherein performing speech processing comprises performing speech recognition using an automatic speech recognition (ASR) model.

16. The system of claim 13, wherein determining whether the respective frame of the microphone signal comprises the double-talk frame or the echo-only frame comprises:
   computing, using the DTD, a respective first frame-level double-talk indicator based on a cross-correlation between a subband of the STFT domain representation of the respective frame of the microphone signal and a corresponding subband of the STFT domain representation of the respective frame of the reference signal;
   computing, using the DTD, a respective second frame-level double-talk indicator based on a cross-correlation between the subband of the STFT domain representation of the respective frame of the microphone signal and a corresponding subband of the STFT domain representation of the respective frame of the output signal;
   determining whether or not at least one of the respective first or second frame-level double-talk indicators satisfy a double-talk threshold; and
   when at least one of the respective first or second frame-level double-talk indicators satisfies the double talk threshold, determining the respective frame of the microphone signal comprises the double-talk frame.

17. The system of claim 16, wherein determining whether the respective frame of the microphone signal comprises the double-talk frame or the echo-only frame further comprises determining the respective frame of the microphone signal comprises the echo-only frame when both of the respective first and second frame-level double-talk indicators fail to satisfy the double talk threshold.

18. The system of claim 16, wherein the respective first frame-level double-talk indicator and the respective second frame-level double-talk indicator are both computed over a predetermined range of frequency subbands.

19. The system of claim 16, wherein determining whether or not at least one of the respective first or second frame-level double-talk indicators satisfy the double-talk threshold comprises determining that at least one of the respective first or second frame-level double-talk indicators satisfy the double-talk threshold when a minimum of the respective first and second frame-level double-talk indicators is less than the double-talk threshold.

20. The system of claim 13, wherein the operations further comprise, for each frame in the sequence of frames of the microphone signal:
   computing, using the DTD, a respective first frame-level double-talk indicator based on a cross-correlation between a subband of the STFT domain representation of the respective frame of the microphone signal and a corresponding subband of the STFT domain representation of one of the respective frame of the reference signal or the respective output signal frame,
   wherein determining whether the respective frame of the microphone signal comprises the double-talk frame or the echo-only frame is based on the respective first frame-level double-talk indicator.

21. The system of claim 20, wherein the operations further comprise, for each frame in the sequence of frames of the microphone signal:
   computing, using the DTD, a respective second frame-level double-talk indicator based on a cross-correlation between the subband of the STFT domain representation of the respective frame of the microphone signal and a corresponding subband of the STFT domain representation of the other one of the respective frame of the reference signal or the respective frame of the output signal,
   wherein determining whether the respective frame of the microphone signal comprises the double-talk frame or the echo-only frame is further based on the respective second frame-level double-talk indicator.

22. The system of claim 13, wherein the acoustic echo canceler comprises a linear acoustic echo canceler.

23. The system of claim 13, wherein the data processing hardware, the microphone, and the acoustic speaker reside on a user computing device.

24. The system of claim 13, wherein performing speech processing on the respective output signal frame for each respective frame in the sequence of the microphone signal that comprises the double-talk frame comprises performing speech processing on the respective output signal frame without performing acoustic echo suppression on the respective output signal frame.

* * * * *